June 17, 1924.

R. H. SWINFORD

REVERSIBLE ROAD SIGN OR MARKER

Filed Dec. 17, 1923

Inventor

Ralph H. Swinford

By Connell & Connell

Attorneys

Patented June 17, 1924.

1,497,958

UNITED STATES PATENT OFFICE.

RALPH H. SWINFORD, OF LOS ANGELES, CALIFORNIA.

REVERSIBLE ROAD SIGN OR MARKER.

Application filed December 17, 1923. Serial No. 681,193.

*To all whom it may concern:*

Be it known that I, RALPH H. SWINFORD, a citizen of the United States, residing at Los Angeles, in the county of Los Angeles and State of California, have invented certain new and useful Improvements in Reversible Road Signs or Markers, of which the following is a specification.

This invention has reference to painted road signs and markers, such as are commonly placed along roads and highways for purposes of advertising and, also, for indicating the distance to a given town or city.

It is not always possible nor, in most instances, desirable to locate these signs and markers on the same side of the road or highway. And, because of the fact that a sign painted to be put up on the left side of the road cannot very well be put up on the right, or vice versa, it is a common practice to have one-half of the total number of signs painted one way and the other half painted just the opposite. In other words, there must be painted both right and left hand signs, all pointing in the same direction, so that certain of the signs are adapted to be set up on the right side of the road and certain others on the opposite side.

Consequently, the adaptability of a sign thus painted is governed and limited by the manner in which it is painted and the fact that two different paintings, as it were, are required when preparing a group of signs or markers for a given road constitutes an item of cost, the elimination of which is a matter of importance, particularly to the many and large commercial houses by which such signs and markers are employed in great numbers as an advertising medium.

It is to eliminate the above mentioned disadvantages and high cost attendant upon the preparation and use of present day road signs and markers that this invention is provided, and to this end it presents a reversible road sign of such construction and design as to be capable, after being painted, of being used either as a left hand sign or as a right hand sign. Hence, when preparing a quantity of the signs, they may all be painted without regard to which side of the road they are intended to be placed on, since they are all equally adapted to either side.

With the above and other objects in view, the invention consists in the novel features of construction and in the particular combination and arrangement of parts, hereinafter more fully set forth and described with reference to the accompanying drawing, wherein.

Figure 1:
Figure 1 is a front elevation of a road sign or marker constructed and assembled in accordance with the invention.
Figure 2:
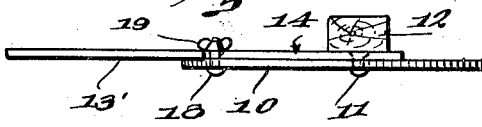
Figure 2 is a top plan view of the same.
Figure 3:
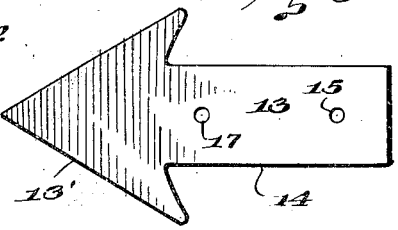
Figure 3 is a detailed view of the reversible part of the sign.

Referring more particularly to Figures 1 to 3, inclusive, 10 designates the main part of body of the sign upon which is adapted to be painted suitable advertising matter, such as indicated by way of example by the words "Coops Shoes," (a fictitious name as applied to shoes) and also mileage-specifying matter, such as represented by the words "9 mi. to." Part 10 may be constructed of wood or metal and is preferably in the form of a disk which is bolted or otherwise secured, as at 11, to a post, tree, or other support 12 in any suitable manner. The method of fastening the disk will be such as to hold the disk stationary relative to the post. The movable or reversible part of the sign is indicated at 13, and, as shown in Figure 3, consists of a pointer having a spear-head 13' and a shank 14, the latter approximately corresponding in length to about half the diameter of the disk 10. Near its outer end, the shank 14 is provided with an opening 15 in which is accommodated the bolt 11 constituting the axis about which the pointer is revolved. By this arrangement, the pointer can be swung in the arc of a circle so as to position the spear-head 13' on either the left or right hand side of the disk 10. When the pointer is in the position indicated in the full lines of Figure 1, the sign is adapted for use on the right hand side of the road and, hence, is what is termed a "right hand sign." When the pointer is reversed so as to point from the opposite side of the disk, as indicated by the dotted lines, the sign is then what is termed a "left hand sign" and is adapted to be used on the left hand side of the road. It will thus be seen that although the initial position of the pointer 13 with respect to the disk 10 determines whether the sign is a left or right hand sign, the fact that the pointer is reversible enables the sign to be conveniently and quickly converted for either right or left hand use whenever required. In order that the pointer may be held stationary in either its right or left hand position, the disk 10 is provided with a pair of openings 16 located, respectively, adjacent relatively opposite edges of the disk so as to coincide with an opening 17 in the shank of the pointer when the latter is in either one of its two indicating positions. Releasable fasteners, such as bolts and nuts, are employed in connection with openings 16 and 17 for securing the pointer to the disk, the shank of the bolt 18 extending through the aligned opening and being engaged by nut 19, as shown in Figure 2. When it is necessary to change over from one side to the other of the disk, the fasteners are simply removed until the pointer has been reversed so that the opening in the shank registers with the other opening 16 of the disk, whereupon the fasteners are then replaced.

Figure 4:
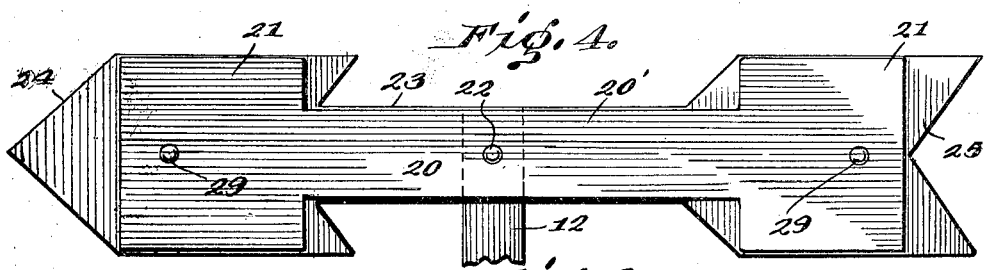
Figure 4 is a view showing a variation of the invention.
Figure 5:
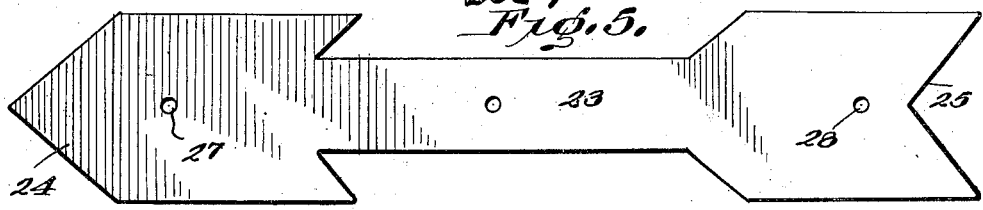
Figures 5 and 6 are, respectively, detailed views of the reversible and non-reversible parts of the sign.
Figure 6:
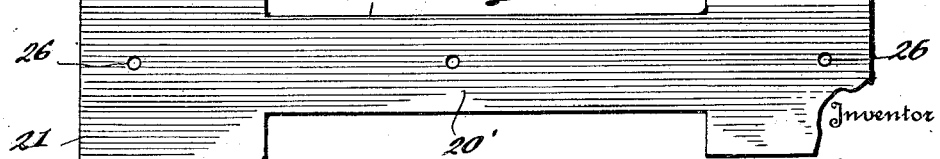

Another form of the invention is illustrated in Figures 4 to 6, inclusive, wherein the invention is shown applied in a sign of the arrow type or style as contrasted with the round or disk sign previously described. In this variation, the main or body part 20 has a relatively long narrow shank 20' which terminates at each end in an enlarged square portion 21. The shank 20' is adapted to be mounted on the post or other support 12 so as to extend horizontally with respect to the ground and it is secured to the support by a bolt or other element 22 passing centrally of the shank. Printed matter for advertising and other purposes is painted upon one face of the shank and squared portion. The indicator of pointer 23 is in the form of a large arrow and, like the pointer 13 of the disk sign, is arranged rearwardly of the painted body portion of the sign, being fulcrumed for movement in the arc of a circle on the bolt 22. The shank of the arrow corresponds, in shape and size, substantially to the shank 20' of the body portion 20 but the head 24 and tail 25 of the arrow are longer than the squared portions 22 and are clearly visible from behind the latter, as will be readily understood from Figure 4. Hence, it is quite easy to ascertain the direction for which the sign is pointed at any time, and by painting the body portion and the arrow in contrasting colors, their visibility is greatly increased. The manner of securing the arrow to the body portion in either one of its two indicating positions is the same as previously described in connection with the disk illustrated in Figure 1; the squared portions 21 of the arrow sign being each provided with an opening 26 and the head and tail of the arrow being provided with openings 27 and 28, respectively adapted to register with opening 26 at times to permit the engagement therethrough of suitable fastening means 29, whereby the arrow and body portions are temporarily fastened together.

From the foregoing it will be observed that one of the advantages of the invention is that it provides a road sign which, by reason of its novel and simplifying construction embodying only one reversible portion (not detachable) can be made more cheaply and of heavier material than has heretofore been found feasible for signs of a like class. Furthermore, the indicating and reversible portion need be painted on one side only, thereby eliminating another item of cost in the make-up of the sign. Other advantages of the invention result from the fact that it is composed of only two main parts rather than a plurality and that there are no detachable parts to become lost.

Moreover, the marker section because of the arrow head construction can be seen at a greater distance. There being no cleats or sub-posts attached to or carried by the reversible road sign, the latter is more adapted to be attached to any post or tree at the appointed place and in any event only a single post need be installed to provide a mounting for the sign, thereby making it cheaper to manufacture, sell, paint, and put up the sign, particularly in large quantities.

What is claimed, is:

1. A road sign or marker comprising a main sign-bearing part and a pointer arranged behind the sign-bearing face of the said main part and pivotally mounted for movement in the arc of a circle with an indicating portion thereof exposed from behind the sign-bearing face of the said main part.

2. A road sign or marker comprising a sign-bearing part and a pointer, the said sign-bearing part and the said pointer being pivoted together for relative movement with the head of the pointer exposed beyond the sign-bearing part of pointing purposes, the said pointer being reversible to point from either the right or left hand side of the said sign-bearing part.

3. A reversible road sign or marker comprising a main or sign-bearing part presenting openings relatively disposed upon opposite sides of the center of the said main part, and a pointer movable about a pivot at the center of the said main part and presenting a single opening adapted upon movement of the pointer into pointing position at either side of the said sign-bearing part to register with the opening in that side of the said main part, the said openings when in registry providing means through which a fastener may be introduced for holding the said pointer stationary relative to the said main part.

4. A reversible road sign and marker comprising a main sign-bearing part adapted to be fastened to a support, said part being painted on one side only, and a pointing part pivoted to the said main part on the nonpainted side thereof and movable to a point from opposite sides of the said main part for adapting the latter for use either as a right or a left hand sign, the said pointer being visible from behind the painted side of the said main part.

In testimony whereof I affix my signature.

RALPH H. SWINFORD.